United States Patent [19]
Sattler et al.

[11] Patent Number: 5,030,289
[45] Date of Patent: Jul. 9, 1991

[54] DURABLE AND HIGHLY STABLE MOLDED CONSTRUCTION PARTS

[75] Inventors: Heinz Sattler; Edmone Roffael; Karsten Lempfer; Wolfgang Heine, all of Brunswick; Josef Baierl, Pahl, all of Fed. Rep. of Germany

[73] Assignees: Fraunhofer Gesellschaft zur Forderung der angewandten Forschung e.V., Munich; Baierl & Demmelhuber GmbH & Co. Akustik & Trockenbau KG, Pahl, both of Fed. Rep. of Germany

[21] Appl. No.: 465,599

[22] Filed: Jan. 19, 1990

Related U.S. Application Data

[63] Continuation of Ser. No. 128,424, Dec. 3, 1987, abandoned.

[30] Foreign Application Priority Data

Dec. 4, 1986 [DE] Fed. Rep. of Germany ....... 3641370
Jun. 16, 1987 [DE] Fed. Rep. of Germany ....... 3720134

[51] Int. Cl.$^5$ ...................... C04B 14/38; C04B 14/42; C04B 37/02
[52] U.S. Cl. .................................. 106/805; 106/711; 106/715; 106/731; 106/780; 106/790
[58] Field of Search ............... 106/711, 715, 731, 780, 106/790, 805

[56] References Cited

U.S. PATENT DOCUMENTS

| 723,015 | 3/1903 | Orr ........................................ 100/93 |
| 2,703,289 | 3/1955 | Wilson ................................. 106/93 |
| 4,600,434 | 7/1986 | Kleinmeyer et al. ................. 75/58 |

FOREIGN PATENT DOCUMENTS

| 258665 | 8/1926 | United Kingdom ................... 100/93 |
| 2077317 | 12/1981 | United Kingdom ................... 106/93 |
| 2117753 | 10/1983 | United Kingdom ................... 106/93 |

Primary Examiner—Karl Group
Assistant Examiner—David M. Brunsman
Attorney, Agent, or Firm—Dennison, Meserole, Pollack & Scheiner

[57] ABSTRACT

Durable molded construction parts are disclosed, which are prepared from the hydration products of a settable construction material comprising a hydraulically hardening mixture and at least one reinforcing material subject to degradation under alkaline conditions. The construction material has an alkali buffer capacity which does not exceed 0.005 acid equivalents per 100 grams of construction material, as measured in an aqueous suspension of the construction material 24 hours after suspension formation.

27 Claims, 1 Drawing Sheet

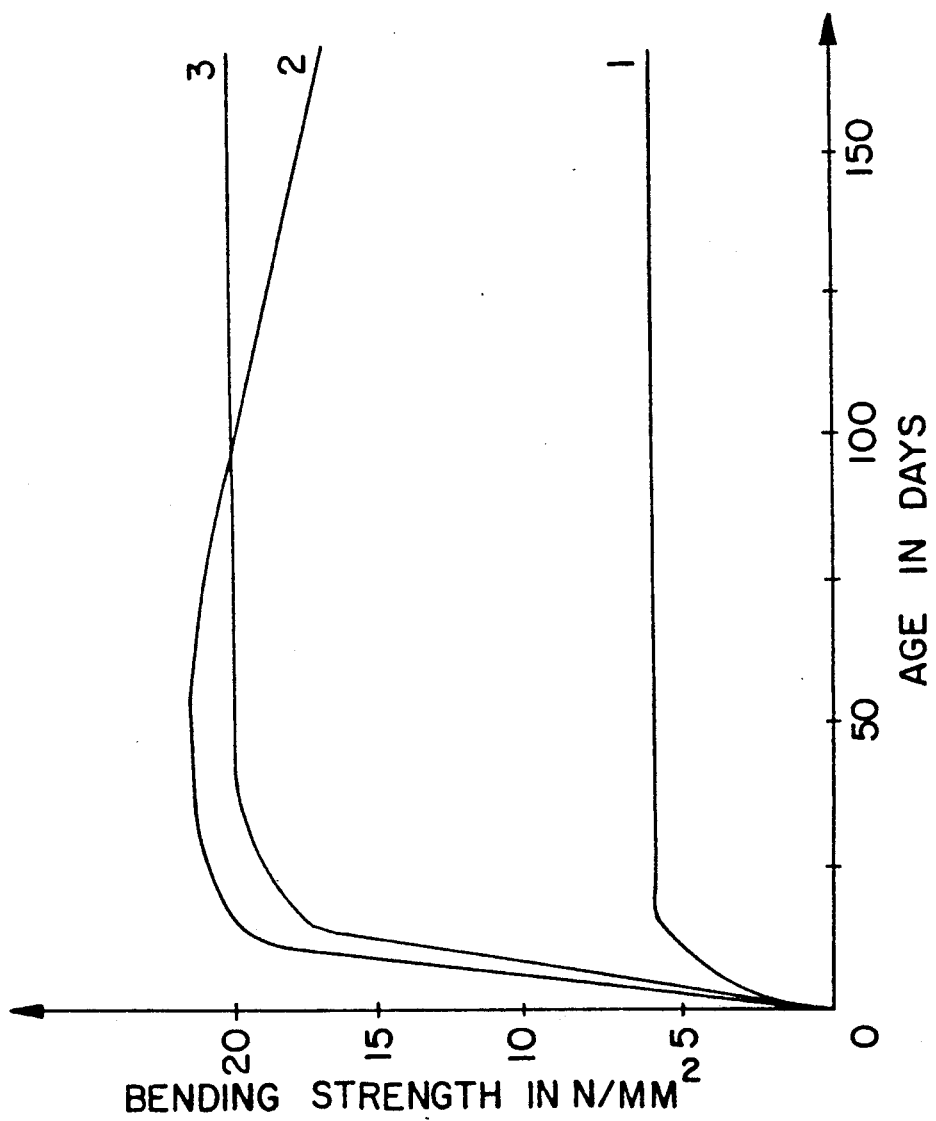

DURABLE AND HIGHLY STABLE MOLDED CONSTRUCTION PARTS

This is a continuation of co-pending application Ser. No. 07/128,424 filed on Dec. 3, 1987, abandoned.

The present invention relates to durable moulded construction parts which in particular are in the form of a plate and consist of hydration products of a cement or a cement-like binder as well as of alkali sensitive reinforcing materials, in particular ligno-celluloses and, when necessary, further components.

In the past, durable moulded construction parts of this kind were usually produced from asbestos cement. In this construction material, asbestos fibres are usually added to the cement as reinforcing material at a mixing ratio of 1:6 to 1:10 (in mass parts). These asbestos reinforced moulded cement parts have properties which are in many respects advantageous and they can be manufactured economically. However, the production and processing of these asbestos-reinforced moulded cements parts involves a high health risk for the people who work with this material. Therefore, for some time now there have been efforts to replace the asbestos fibres in asbestos cement construction materials with other fibres serving as reinforcement. In some cases inorganic fibres were used for this purpose, such as glass fibres, basalt fibres and slag fibres. Other cases involved the substitution of the asbestos fibres with fibres of an organic nature, such as synthetic fibres and ligno cellulose-like fibres. In this case ligno cellulose-like fibres such as bamboo fibres, cotton fibres and sisal fibres were considered. Whereas the examination of construction materials containing inorganic fibres as reinforcing material produced all in all unsatisfactory results, the use of ligno-celluloses as reinforcing materials produced good preliminary strength results. However, if the long-term behaviour is taken into consideration here, a constant decrease in the preliminary strength may be observed.

The decrease in the bending strength of ligno-cellulose-reinforced cement materials, which is dependent on the time factor, is due to the high alkalinity of a cement matrix. It is assumed that the ligno-celluloses are not durable in an alkaline medium. With glass-fibre-reinforced cements there is also a considerable reduction in the bending strength due to the corrosion of the glass caused by the alkali. In the relevant literature, there are therefore different suggestions for improving the properties of ligno-cellulose-reinforced or glass-fibre-reinforced cement materials, the essential problem of a sufficient reduction of the alkalinity, however, is not discussed.

Consequently, all known suggestions for the cement modification can at best reduce the corrosion of alkali-sensitive fibres but not prevent the corrosion entirely—which would be necessary for the unlimited utilization of such a material combination.

The modification of conventional Portland cements with active pozzolanic materials, in particular of a silicate nature such as silica gel, thus increasing the durability of the ligno-celluloses in the cement matrix is, for example, already known. In the published European patent application 68 742 it was suggested in this respect that a substitute for asbestos cement be produced from 50% to 90% of cement—whereby it can be gathered from the context that Portland cement is meant here—5% to 40% of highly active pozzolanic silica and 5% to 15% of cellulose fibres. In order to improve the activity of the pozzolanic material, it is necessary that it has a specific surface of at least 15,000 m$^2$/kg; an even better value, however, would be at least 25,000 m$^2$/kg.

Furthermore, it is known from the International Publication No. WO 85/03700 that binder mixtures consisting of 75% to 40% of Portland cement and 25% to 60% of amorphous silica can be used for producing cement-bound moulded wood fibre bodies. Moreover, it may be gathered from this printed specification that the activity of the pozzolan increases with the fineness of the grain. The preferred range of grain size (15 to 25 m$^2$/g) is completely identical with that of the afore-mentioned published European patent application 68 742. The British specification GB-PS 1 588 938 also describes a process for manufacturing moulded fibre-cement bodies. According to this printed specification, glass fibres in an amount of 0.5% to 20% referring to the binder weight are added as reinforcing material. The glass fibres added have to be substantially resistant to alkali and thus a reduction of the alkalinity in the medium surrounding the glass fibres is not considered. Under this prerequisite, however, a substitution of the glass fibres with cellulose fibres or wood fibres will inevitably produce the above-mentioned negative long-term behaviour due to the alkalinity of the medium.

In contrast to the known moulded asbestos cement construction parts, the AT-PS 3457/12 relates to a fireproof and incompressible asbestos cement construction material consisting of a mixture of asbestos, cement and materials containing silicic acid whereby the fibres should be resistant to corrosion in an alkaline medium. Here it is assumed that the fibre materials considered have to be regarded as alkali-resistant.

Finally, in an extensive examination carried out by GRAM in 1983 (H. E. Gram, "Durability of natural fibers in concrete"; Swedish Cement and Concrete Research Institute, S-100 44 Stockholm, 255 pages) it was found that sisal fibres become brittle when they are in aqueous buffer solutions with a pH-value of above 12. Other ligno-celluloses were not examined for embrittlement in alkaline solutions. In the GRAM report, in which the literature regarding "ligno-celluloses in the cement matrix" is evaluated very critically, it is concluded that when certain materials, which cause a reduction in the pH-value of the binder cement, are added to the cement, this can also increase the durability of ligno-celluloses in the cement matrix. Thus, for example, an improvement of the durability of ligno-celluloses in a cement matrix is obtained when the binder cement is partially substituted with silicate materials such as amorphous silicic acid (e.g. SILICA FUME). The partial substitution of Portland cement with alumina cement also results in an improved fibre durability of the sisal fibres embedded in a cement matrix.

All the suggestions for improving the fibre durability made in the state of the art merely retard the damaging of the fibres. In the usual expected life span of construction materials of this kind, however, fibre corrosion takes place to an increasing extent. It is not yet possible to prevent fibre corrosion entirely.

Up until now it has been assumed that the damaging of the fibres was only due to the alkalinity of the surrounding matrix which is defined by the pH-value. According to the state of the art thus either alkali-resistant reinforcing materials were used, which, however, can only be used to a limited extent due to their specific properties, or it was tried to reduce the pH-value of the binder matrix.

In spite of extensive research in particular in the past few years it has not been possible so far to provide durable moulded construction parts which on the one hand contain the alkali-sensitive fibres serving as reinforcing material and on the other hand contain the alkaline binder systems.

It is therefore the task of the present invention to provide moulded construction parts in which fibres on the basis of ligno-celluloses or other alkali-sensitive fibres are embedded as long-term durable reinforcement for increasing the strength of the construction material.

The solution to the above problem is based on the knowledge that the damaging of ligno-celluloses in the cement matrix is due to the alkaline buffer capacity of the produced construction material rather than to the pH-value of the binder used. From this basic knowledge the technical teaching of the present invention has been derived, namely that an alkaline buffer capacity of the construction material, which is variable and sufficiently low, does not exceed 0.005 acid equivalents/100 g of construction material in a defined aqueous test suspension 24 hours after its production.

The solution according to the invention is also based on the knowledge that a certain buffer capacity has to be reached in order to prevent fibre corrosion. The significance of the buffer capacity as a decisive influencing factor has not been recognized in the state of the art up until now so that the requirements which the present solution according to the invention puts on the binder system cannot have been taken into consideration in the cements or cement modifications suggested so far.

In an advantageous embodiment of the invention cement-bound moulded construction parts containing a durable reinforcing material in the form of ligno-celluloses can be produced by mixing conventional Portland cements, alumina cements and belite cements or mixtures thereof at such a gravimetric ratio with active pozzolan such as amorphous silicic acid, powdered trass and fly ash and, if necessary, with or without adding acids until a sufficient buffer capacity of the material or a value below it has been reached.

When acids are added for reducing the buffer capacity as suggested in the invention, the additional effect of accelerated hardening of the binder may, furthermore, be made use of if the acids are chosen according to the acceleration properties of their calcium salts. The addition of 1.0 to 2.5 ml of concentrated hydrochloric acid to 100 g of a binder with Portland cement as its main component, for example, results in a considerable reduction in the buffer capacity and acceleration of the hardening process. With binders having alumina cement as their main component a similar effect may be observed when 0.5 to 4.0 ml of concentrated sulfuric acid are added to 100 g of a binder. Depending on the composition of the binder and its use, the addition of other anorganic or organic acids may also produce the desired effect.

Of course, any other binder systems which have the characteristic features described in the solution according to the present invention, are also considered to be a solution to the afore-mentioned problem. Moulded construction parts with glass fibres as reinforcing material also have the desired long-term behaviour when the teaching according to the invention was observed.

In the present invention it is assumed that asbestos fibres or other alkali-resistant fibres and conventional Portland cements were used for the production of moulded construction parts or composites and that this produces excellent results. Thus it is further known that materials made from asbestos cement in their compressed state (material density 1.7–2.1 kg/dm$^3$) with bending strengths of 20–35 N/mm$^2$ and high long-term durability or weatherproofness have so far been considered beyond all comparison with any other composites. The known composites made from asbestos cement optimally fulfilled the requirements of their users. The production and use of asbestos cement products, however, have to be stopped due to the ecological and physiological problems linked with the material asbestos. For this reason, the substitution of the asbestos fibres has become a problem which has to be solved without delay. As a result of most intensive research work inorganic and organic fibres have been developed which are, above all, resistant to an alkaline medium in a Portland cement matrix. When these substitutes are used, however, the high bending strengths of asbestos cement cannot be reached by far. The use of cellulose fibres in combination with Portland cement produced preliminary strengths which are closest to but not identical to that of asbestos cement. However, moulded construction parts comprising cellulose fibres as reinforcing material were disappointing in their long-term behaviour since the cellulose fibres proved to be alkali-sensitive and thus fibre corrosion occurred.

All known substitute solutions with alkali-resistant synthetic fibres have the shortcoming that although the production costs for the fibres are high, only relatively low bending strengths of the material can be obtained, or that although good preliminary strengths are obtained when non-alkali-resistant cellulose fibres in combination with Portland cement, the long-term strengths are unsatisfactory.

It is, therefore, a further object of the invention to improve the initially good reinforcing behaviour of inexpensive and readily available non-alkali-resistant fibres, in particular waste paper fibres and cellulose fibres, which are bound with hydraulically hardening binders so that the long-term behaviour is also satisfactory and the material can be used in industry and thus to make the production of long-term durable and weatherproof composites possible which have bending strengths that are equal to or higher than that of asbestos cement. Furthermore, a long-term durability is also to be obtained with materials other than asbestos.

This additional problem is solved according to the invention in that the above described durable moulded construction part which is made from a material comprising a fibre material and a binder system whereby the binder is a hydraulic binder with a considerably lower lime content and a much higher content of calcium sulfate than that of Portland cement and the fibres are alkali-sensitive fibres, in particular cellulose fibres.

According to the preferred embodiment of this parts of the invention the binder consists of 60%–80% by mass of a latently hydraulic component, e.g. ground blast sand or ground blast slag, 15%–25% by mass of a calcium sulfate component, e.g. hemi-hydrate gypsum (Plaster of Paris) and 3%–10% of a conventional cement component, e.g. Portland cement or Portland clinker. The latently hydraulic component should contain 8%–15% by mass of amorphous reactive $Al_2O_3$, 1%–10% by mass of amorphous MgO (not in the form of periclas) and 35%–45% by mass of CaO.

When mixed with water, the binder hardens, thereby forming water- and weatherproof solid gels and crystalline hardening products.

The $Al_2O_3$ content ensures a good sulfatic stimulation and—in combination with the other active components—it results in the development of high bonding strengths between the binder matrix and the cellulose fibre. It is, therefore, possible to even add up to 40% by mass of cellulose fibres, referring to the binder mass. The optimum amount to be added ranges between 5%–40% by mass of cellulose fibres, referring to the binder mass.

The $Al_2O_3$ promotes the formation of gel and the bonding of CaO and MgO so that the alkalinity is permanently reduced to a value which is not damaging to the cellulose fibres, as it is described in P 36 41 370.4.

In contrast to moulded construction parts comprising conventional fibre composites, the moulded construction parts according to the invention are considerably more effective since they have an even higher strength than the asbestos cements, which had the reputation of being highly strong (stable), and they produce extremely advantageous strength-density-ratios. Furthermore, their economical effectiveness is increased by the fact that recycling materials (such as blast slag, gypsum obtained from flue gas desulfurisation, and waste paper) can be used which are, as a rule, inexpensive.

The fiber/binder mixtures, which have the composition claimed in the invention and which are used for the production of the moulded construction parts, harden out, thus resulting in high bonding strengths between the cellulose fibres and the binder matrix. The reinforcing effect of the cellulose fibre in this binder matrix is durable since due to the special binder composition the alkalies are bound to such an extent that a low alkalinity which is not damaging to the cellulose fibre is obtained. Here the requirements defined in the German patent application P 36 41 370.4 are fulfilled optimally. The hardened fibre composites have high bending strengths, are to a vast extent durable in the long term, and are weatherproof. Moreover, they feature an improved acid resistance compared to products made from Portland cement. In spite of the high bending strengths their modulus elasticity module is relatively low which suggests a lower proneness to brittle fracture compared to conventional cement products and a reduction in the clamped stresses due to the inevitable influence of moisture—and temperature gradients in the plates which are usually firmly built in.

In the following, the invention is explained in examples whereby further details, characteristic features and advantages of the moulded construction parts according to the invention are emphasized. If not set out differently, the composition of the binder and the share of fibres are each indicated in mass percentage. The buffer capacity in the examples was determined as follows:

10 g of the material were mixed with 50 ml of aqua dest., the mixture was shaken for 24 hours at room temperature, subsequently 20 ml of the solution were titrated with 0.1 n HCl to pH=7 and the consumption of hydrochloric acid per 100 g of material was converted into acid equivalents.

EXAMPLE 1

Moulded construction parts are produced from 100 parts of high-lime Portland cement (PZ45F) and 18 parts of ligno-cellulose fibres. The buffer capacity measured after one day is around 0.013 acid equivalents/100 g of construction material and is thus more than twice as high as the claimed limit value. The bending strength was measured after 14 days and was 21.3 $N/mm^2$. After 168 days it was measured again and was only 16.9 $N/mm^2$.

EXAMPLE 2

19 parts of ligno-cellulose fibres were added to 100 parts of a Portland cement with a lower lime content, i.e. belite-rich cement (PZ35L), and moulded construction parts were produced from this mixture. The buffer capacity was 0.011 acid equivalents/100 g of construction material after one day and was thus also above the claimed limit value. The bending strength after 14 days was 18.5 $N/mm^2$; after 168 days the bending strength was only 15.7 $N/mm^2$.

EXAMPLE 3

A moulded construction part made from 60 parts of a Portland cement with a lower lime content, i.e. belite-rich cement (PZ35L), 40 parts of alumina cement and 18 parts of ligno-cellulose fibres has a buffer capacity of 0.005 acid equivalents/100 g of construction material after one day. This value corresponds to the claimed upper limit value. After 14 days a bending strength of 18.4 $N/mm^2$ was measured. The measuring of the long-term durability after 168 days produced a bending strength of 20.3 $N/mm^2$, which is an increase in strength.

EXAMPLE 4

A moulded construction part made from 57 parts of a Portland cement with a lower lime content, i.e. belite-rich cement (PZ35L), 38 parts of alumina cement, 5 parts of amorphous silicic acid and 18 parts of ligno-cellulose fibres after one day has a buffer capacity of 0.005 acid equivalents/100 g of construction material, which is the claimed limit value. The bending strength after 14 days is 18.1 and the bending strength after 168 days is 18.2 $N/mm^2$.

EXAMPLE 5

A moulded construction parts is made from 27 parts of lime-rich Portland cement (PZ45F), 40 parts of alumina cement, 29 parts of fly ash and 4 parts of sulphuric acid together with 20 parts of ligno-cellulose fibres. The buffer capacity after one day is 0.004 acid equivalents/100 g of construction material. Thus the buffer capacity is in the claimed range and below the claimed limit value. The bending strength after 14 days was 19.4 $N/mm^2$ and after 168 days the bending strength was 20.5 $N/mm^2$.

When the five examples are compared, it is clear that when the buffer capacity is in the claimed range the moulded construction parts of different compositions will feature the desired long-term behaviour.

The process according to the invention is further explained by means of a FIGURE.

The FIGURE is a diagram which shows the trend of the bending strength development with comparable density of the construction material.

The ordinate is the bending strength in $N/mm^2$ and the abscissa is the age in days. The curves 1, 2 and 3 refer to three different compositions of the construction material. Curve 1 is characteristic for hardening products from conventional Portland cements or binder having the composition according to the invention without fibre reinforcement, the increase in the strength of which is first fast due to hydration and then only very slow.

Curve 2 shows moulded construction parts with cellulose reinforcement according to the state of the art which are made from Portland cement as they are mentioned in the above Example 1. The bending strength of these moulded construction parts decreases steadily due to damaging of the fibres because of alkali after having reached a maximum. The curve seems to approach the value of the matrix strength according to curve 1 asymptotically.

The curve representing the bending strength (curve 3) is typical of a cellulose-fibre reinforced construction material according to the present invention, for example for moulded construction parts according to the above examples 3 to 5. The bending strength at first increases very much until a very high strength value is reached. Then, however, a slight gradual increase of the strength value can be observed in contrast to the moulded construction part according to curve 2. This increase corresponds approximately to the increase which also occurs in curve 1 due to increasing hardening of the matrix. The damaging of the fibres has been avoided in these moulded construction parts according to the invention.

The following examples 6 to 9 show embodiments according to claims 4 to 14.

EXAMPLE 6

A moisture-resistant and weatherproof composite for producing the moulded construction parts was made from:

75% by mass of blast sand ground as finely as the binder (Blaine value of at least 3500 cm$^2$/g)
20% by mass of plaster of Paris according to DIN 1168 (DIN: Deutsche Industrienorm, German Industrial Standard)
5% by mass of Portland cement 45 according to DIN 1164
20% by mass of waste paper fibres or cellulose fibres The ground blast sand comprises the following components: 34.44 SiO$_2$, 0.39 TiO$_2$, 12.75 Al$_2$O$_3$, 1.22 Fe$_2$O$_3$ (the entire Fe as Fe$_2$O$^3$), 0.18 MnO, 42.1 CaO, 7.84 MgO, 0.36 Na$_2$O and 0.6 K$_2$O.

The composite produced from these components had a dry density of at least 1.3 kg/dm$^3$ and a minimum strength of 20 N/mm$^2$.

EXAMPLE 7

A moulded construction part was produced from
73% by mass of a blast sand ground as finely as the binder and having the composition described in Example 6
20% by mass of plaster of Paris according to DIN 1168
7% by mass of Portland cement 45 according to DIN 1164
20% by mass of waste paper fibres or cellulose fibres The composite plates had a dry density of at least 1.5 kg/dm$^3$ and a minimum bending strength of 30 N/mm$^2$.

The same results were obtained when gypsum from flue gas desulfurisation was used instead of plaster of Paris.

EXAMPLE 8

A moulded construction part was produced from the following components:
73% by mass of blast sand ground as finely as the binder and having the composition of Example 6
20% by mass of plaster of Paris according to DIN 1168
7% by mass of Portland cement 45 according to DIN 1164
22% by mass of waste paper fibres or cellulose fibres.

The plates produced from this composition had a dry density of at least 1.5 kg/dm$^3$ and a minimum bending strength of 45 N/mm$^2$. When gypsum obtained from flue gas desulfurisation was used instead of plaster of Paris, the construction material had the same properties.

EXAMPLE 9

A moulded construction part was produced from the following components:
73% by mass of blast sand of the composition from Example 6
20% by mass of plaster of Paris according to DIN 1168
7% by mass of Portland cement 45 according to DIN 1164
30% by mass of waste paper fibres or cellulose fibres.

The binder mixture was most finely ground to a Blaine-value of at least 6,000 cm$^2$/g and preferably to around 7,500 cm$^2$/g. In general, the binder mixture should be ground until a specific surface area of 5000 to 10,000 cm$^2$/g is obtained.

A moulded construction part produced in this manner has a minimum bending strength of 45 N/mm$^2$ and a dry density of only at least 1.4 kg/dm$^3$. In Table 1 the bending strength-density ratios of the four examples are shown again.

TABLE 1

| Bending strength-density ratios $\frac{Ndm^3}{mm^2kg}$ | Example no. |
|---|---|
| 15.4 | 6 |
| 20.0 | 7 |
| 30.0 | 8 |
| 32.1 | 9 |

In comparison with these construction parts, conventional moulded construction parts made from asbestos cement only reach bending strength-density ratios of around 12 to 17 (Ndm$^3$/(mm$^2$kg)).

The Examples 6 to 9 clearly show that—compared to moulded parts made from asbestos cement—the moulded construction parts according to the invention have the same or higher bending strengths already with low density of the construction material and they thus feature an essentially improved input-output ratio. The economical effectiveness of the moulded construction parts according to the invention is due not only to the high bending strength-density ratios but also in particular to the low raw material prices for the materials used. The moulded construction parts according to the present invention can be produced by means of conventional wet and semi-dry technologies so that time- and money-consuming R & D work for new production technologies is avoided.

We claim:
1. Durable molded construction part, in cured form, prepared from the hydration products of a settable construction material comprising a hydraulically hardening binder mixture and at least one reinforcing material subject to degradation under alkaline conditions, wherein said construction material has an alkali buffer capacity which does not exceed 0.005 acid equivalents per 100 grams of construction material, as measured in an aqueous suspension of the construction material 24 hours after suspension formation such that corrosion of the reinforcing materials is substantially prevented.

2. Construction part according to claim 1, wherein said binder mixture comprises at least two components selected from the group consisting of Portland cement, alumina cement, bellite-rich cement, and pozzolanic substances.

3. Construction part according to claim 2, wherein said pozzolanic substances are selected from the group consisting of amorphous silicic acid, powdered trass, fly ash and mixtures thereof.

4. Construction part according to claim 1, wherein said alkali buffer capacity is adjusted by addition of an acid.

5. Construction part according to claim 1, wherein said binder mixture comprises a finely ground, latently hydraulic component, calcium sulphate and Portland cement.

6. Construction part according to claim 5, wherein said binder mixture comprises, by weight, 60 to 80% of a ground latently hydraulic component, 15 to 25% calcium sulphate and 3 to 10% Portland cement.

7. Construction part according to claim 5, wherein said latently hydraulic component comprises, by weight, 8 to 15% of amorphous $Al_2O_3$, 30 to 40% amorphous $SiO_2$, 1 to 10% amorphous $MgO$, and 35 to 45% $CaO$.

8. Construction part according to claim 5, wherein said latently hydraulic component comprises granulated blast furnaced slag.

9. Construction part according to claim 5, wherein said calcium sulphate component comprises a technical hemihydrate gypsum.

10. Construction part according to claim 1, wherein said binder mixture comprises a finely ground latently hydraulic component and calcium sulphate.

11. Construction part according to claim 1, wherein said binder mixture comprises a finely ground latently hydraulic component, calcium sulphate and a calcium component.

12. Construction part according to claim 1, wherein said reinforcing material comprises a ligno-cellulose.

13. Construction part according to claim 12, wherein said reinforcement material comprises waste paper fibers.

14. Construction part according to claim 11, comprising 5 to 40% by weight cellulose fibers.

15. Construction part according to claim 1, wherein said reinforcing material is selected from the group consisting of glass fibers, cellulose fibers and mixtures thereof.

16. Construction part according to claim 15, wherein said reinforcing material comprises 5 to 40% by weight of said settable construction material.

17. Method of manufacturing a durable molded construction part from hydration products of a settable construction material comprising a hydraulically hardening binder mixture and at least one reinforcing material subject to degradation under alkaline conditions, comprising mixing said reinforcing material with a binder mixture selected such that said construction material has an alkali buffer capacity which does not exceed 0.005 acid equivalents per 100 grams of construction material, as measured in an aqueous suspension of the construction material 24 hours after suspension formation, such that corrosion of the reinforcing materials is substantially prevented and adding sufficient water to set said construction material.

18. A method according to claim 17, wherein said binder mixture comprises Portland cement and alumina cement.

19. Method according to claim 17, wherein said mixture comprises bellite-rich cement, Portland cement and alumina cement.

20. Method according to claim 17, wherein said binder mixture comprises Portland cement and pozzolanic substances.

21. Method according to claim 20, wherein said pozzolanic substances are selected from the group consisting of amorphous silicic acid, powdered trass, fly ash and mixtures thereof.

22. Method according to claim 17, wherein said binder mixture comprises a finely ground latently hydraulic component, calcium sulphate and Portland cement.

23. Method according to claim 17, wherein said reinforcing material comprises ligno-cellulose.

24. Method according to claim 17, wherein said binder mixture and said reinforcing material are finely ground together before the addition of water.

25. Method according to claim 24, wherein said binder mixture and reinforcing material are ground until a specific surface area in the range of 5000 $cm^2/g$ to 10000 $cm^2/g$ is obtained.

26. Construction part according to claim 1, having a bending strength of 18.2 to 20.5 $N/mm^2$, measured 168 days after production.

27. Construction part according to claim 1, having a bending strength which increases during the period between 14 and 168 days after production.

* * * * *